United States Patent Office 3,186,941
Patented June 1, 1965

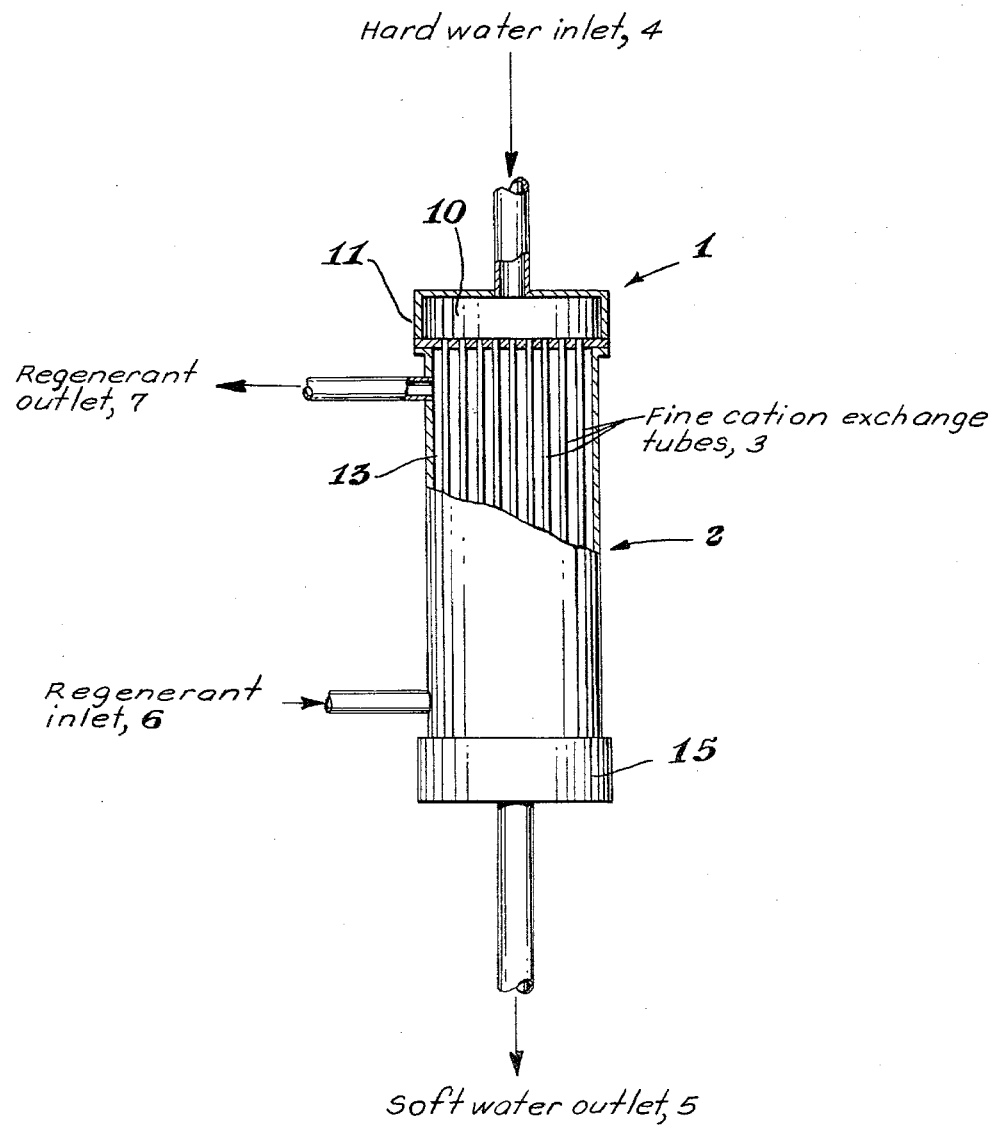

3,186,941
WATER SOFTENING WITH FINE CATION EXCHANGE TUBES
William E. Skiens, Pittsburg, Calif., assignor to The Dow Chemical Company, Midland, Mich., a corporation of Delaware
Filed Aug. 2, 1962, Ser. No. 214,191
5 Claims. (Cl. 210—30)

This invention relates to a method for continuous softening of hard water with cation exchange materials. More particularly, it relates to a method for the softening of hard water with fine, flexible cation exchange tubes wherein the softening capacity can be regenerated without interrupting normal flow of softened water.

In water conditioning processes, it is a common practice to soften water by removing calcium and magnesium ions. Usually this is achieved by percolating hard water through a stationary bed of a granular cation exchange resin initially in the hydrogen or sodium form. Through cation exchange with the resin, the alkaline earth ions are removed from the water and replaced by hydrogen or sodium ions. When the softening capacity of the resin has been exhausted or substantially reduced, it is necessary to regenerate it by interrupting the water treatment and passing a regenerant solution through the bed. The regenerant solution, which may be dilute acid or a solution of a sodium salt such as sodium chloride depending on the form of active resin desired, restores the softening capacity by displacing the alkaline earth ions from the depleted resin.

Water softening by cation exchange is particularly suitable for home installations. A standard home unit containing about 1.0 to 1.5 cubic feet of cation exchange resin usually has sufficient capacity to operate from 1 to 4 weeks between regenerations. Recently, smaller units have been made which may be set for daily regeneration at a time, such as 3 a.m., when normal water demand is low. However, even with such units it is necessary to interrupt water treatment for a period of 0.5 to 1.5 hours during the regeneration cycle.

It is an object of the present invention to provide a method of softening water by cation exchange whereby normal water treatment may be maintained during the regeneration cycle. It is a further object to provide a method of softening water by a cation exchange process whereby either continuous or intermittent regeneration is possible, as required to maintain at least a minimum softening capacity. A still further object of this invention is provide a method for softening water which by combining uninterrupted treatment of hard water with increased flexibility of regeneration permits the construction of smaller, less expensive home water-softening units.

These and other objectives are achieved by using as the cation exchange material an exchange element comprising at least one fine, flexible cation exchange tube, and even more advantageously for most purposes, a bundle of such tubes. The thin wall of each tube is a permselective cation exchange membrane separating the water being processed from the regenerant solution. Thus, the water to be softened may be passed continuously or on demand on one side of the membrane while the regenerant solution may be circulated independently on the opposite side of the membrane as required to maintain at least a minimum softening capacity.

Referring to the drawing which presents one schematic embodiment of the present invention in the form of a water softening unit suitable for home use, the unit 1 includes basically a shell structure 2 within which is positioned a plurality of fine, flexible cation exchange tubes 3. The unit 1 includes a hard water inlet line 4 and an outlet line 5 for the treated and softened water. It also has an inlet line 6 and outlet line 7 for the circulation of a regenerant solution from regenerant tank not shown. At the hard water entrance end, the inlet 4 feeds a header chamber 10 separated by a header plate 11 which supports the fine cation exchange tubes 3 and seals them from the regenerant solution flowing outside the fine cation exchange tubes in the regenerant chamber 13. A similar plate at the terminal end of the fine cation exchange tubes forms a terminal chamber 15.

Semipermeable membranes have been known for many years. The art encompasses numerous materials having in varying degrees the property of being permselective to different components of fluid mixtures. Of particular interest in view of the invention described herein, are ion exchange membranes which will selectively transfer ionic species from one solution to another. Several such ion exchange membranes are commercially available in the form of thin, flat sheets or plates. They have been used in the well-known electrodialysis process for purification of brackish water. However, the use of such membrane sheets for the softening of water by dialysis alone, without an imposed electrical potential, has received little attention.

The permselective cation exchange membranes suitable for a water-softening process have been available only in the form of thin sheets which are relatively weak and susceptible to rupturing. For example, a typical membrane sheet having a thickness of about 0.1 mm. can be used safely only with operating pressures of less than about 10 p.s.i. Thus, in the electrodialysis process special units are required to hold the thin permselective ion exchange sheets and the necessary rigid supporting and back-up plates. Such units inherently have considerable "dead" space and weight.

In the practice of the present invention, fine, flexible cation exchange tubes having an outside diameter of less than 2 mm. and a wall thickness of less than about 0.3 mm. are used. Cation exchange tubes of this nature have not been prepared before or used for softening hard water. It has been found that these fine cation exchange tubes are more efficient and satisfactory than sheet membranes. Because of the laws of fluid pressure, these fine tubes are better suited to withstand pressure than flat membranes. Indeed the fine tubes of this invention have sufficient strength that lengths of 12 inches or more may be used with support only at each end. Backing plates and other types of supports required by conventional sheet membranes are eliminated.

Advantageously, a plurality of tubes of a similar length may be gathered together as in a bundle for use in a water-softening unit. With tubes 2 mm. or less in outside diameter, such a unit would have a ratio of transfer surface to unit volume at least as great as a conventional electrodialysis apparatus having a stack of flat membranes. In fact, very fine tubes having an outside diameter of 0.05 mm. or less provide a transfer surface of 10,000 ft.$^2$ or more/ft.$^3$ of unit volume, a surface to unit volume ratio that is greater than that of a conventional flat membrane apparatus by a factor of 20 or more.

The efficiency of a water-softening unit employing the cation exchange tubes of this invention is determined to a large extent by the dimensions and permselective characteristics of the tubes. But obviously, the material chosen for the cation exchange tubes must be capable of yielding thin tubes having the requisite physical and chemical stability.

For use in the process of this invention, the cation exchange tube generally is made from a hydrophobic polymer having appended cation exchange functionality. Particularly valuable for use in water-softening applications are permselective cation exchange tubes having sulfonic acid groups as the active exchange sites. The negative charges of the immobile sulfonic groups restrict passage of ions through the wall of the tube whereas cations are free to undergo exchange reactions.

Such permselective cation exchange tubes can be prepared by several techniques. The desired exchange functionality can be incorporated into the polymeric material prior to its formation into fine tubes by procedures known in the art such as melt or wet spinning techniques. In other instances, it is advantageous to treat a suitable preformed polymer so as to impart the cation exchange properties. Thus, a satisfactory permselective cation exchange tube is obtained by treating flexible polyethylene tubing, or tubing of a copolymer prepared largely from ethylene, in the dry state with chlorosulfonic acid until the tube has been sulfonated throughout as described more fully in de Jong, U.S. 2,858,264. Alternatively, a cation exchange tube which is chemically similar to the conventional sulfonated styrene divinylbenzene beads, is prepared by graft polymerization of an aromatic monomer such as styrene or vinyltoluene onto a suitable polymer backbone having the desired shape using methods such as described in British 809,838. The resulting graft copolymer is then sulfonated by conventional means using chlorosulfonic acid, sulfur trioxide, or other sulfonating agent. Depending on the extent of sulfonation, cation exchange tubes prepared as described may have an exchange capacity as high as 5 meq./g. dry resin, H+ form, or more.

The optimum diameter of the fine cation exchange tubes will vary somewhat according to the physical properties of the polymer and the anticipated operating conditions. In general, the finer tubes have a higher transfer surface per unit volume. The diameter of the tube also affects the transfer rate. But the most important factors influencing the transfer rate are the actual permselective characteristics of the polymer and the wall thickness of the cation exchange tube. The thinner the wall is, the lower the transfer resistance and the greater the ion transfer rate. However, for use at moderate operating pressures, tubes prepared from most polymers should have a substantially uniform wall thickness that is about 1/3 to 1/8 of the outside diameter of the tube. Such tubes will withstand a minimum external pressure of at least 100 p.s.i. without collapsing and a somewhat greater internal pressure without rupturing. A wall thickness less than 1/8 the outside diameter increases the chance that the tube may collapse or rupture; whereas a wall thickness greater than 1/3 the outside diameter leads to an unnecessary decrease in the ion transfer rate.

In the practice of this invention, it is desirable to employ cation exchange tubes having substantially uniform inside and outside diameters. While the outside diameter may be as large as 2 mm., finer tubes having an outside diameter of from 0.1 mm. to 0.01 mm. are advantageous. Within the limits given for the ratio of wall thickness to outside diameter, the wall thickness of these tubes may range from about 0.3 mm to 0.002 mm. or less.

A convenient arrangement for a compact water-softening unit is to use a multiplicity of fine cation exchange tubes in an arrangement such as a bundle connected so that hard water flows inside the tubes while the regenerant solution may be circulated on the outside, or vice versa. For maximum efficiency, the regenerant solution should flow countercurrent to the water stream. To minimize corrosion and regenerant leakage, the regenerant stream should be electrically insulated from the water stream. Thus, the shell and internal supports of the water-softening unit should be constructed of plastic, plastic-coated steel, or other electrical insulating material.

The degree to which hard water may be softened with a unit containing cation exchange tubes will be influenced by such factors as the hardness of the water, the flow rate, the exchange capacity, and the frequency of regeneration. Since the hard water and regenerant solution flow separately on opposite sides of the cation exchange tubes, each flow may be regulated independently and service is not interrupted by regeneration. Thus, frequent regeneration is feasible, perhaps once every 1 to 12 hours during normal operation.

Under extreme conditions continuous regeneration may be desired. But because of possible salt leakage through the cation exchange tubes into the static service water during periods when there is no flow of softened water from the unit, intermittent regeneration whenever required to maintain a desired softening capacity is preferred for home units. Such intermittent regeneration is easily regulated on the basis of the volume of hard water treated. For example, for small home units the regeneration cycle might be set to operate each time 60 gallons of hard water passes through the unit. Since the regeneration cycle includes a final water rinse to remove residual salts, the problem of regenerant leakage through the permselective tube during periods when the unit is not being used is minimized.

Most frequently, a solution containing 5 to 15 percent by weight of common salt is used for regeneration. In some cases, salt may be advantageously replaced by sodium carbonate, sodium sulfate, sodium polyphosphate, or by the sodium salt of a chelating agent such as ethylenediamine tetraacetic acid. For use in conjunction with a clothes washer, the waste soapy water may be used as regenerant solution.

A water-softening unit employing cation exchange tubes may be used to treat water at any temperature up to its boiling point at the operating pressure, subject only to the limits of temperature and corrosion stability of materials of construction including the tubes. Current systems may be used at temperatures up to about 180° F. with a normal water supply pressure of about 25 to 50 p.s.i. and a pressure on the regenerant side of from 0 to 50 p.s.i.

For a typical home water-softening unit patterned in accord with the present invention, 0.5 lb. of cation exchange tubes with an exchange surface area of about $3 \times 10^5$ cm.$^2$ and an exchange capacity of 180 meq./min. (equivalent to 280 grains CaCO$_3$/min.) is needed. Then to soften water having a hardness of about 15 grains/gal., the hard water is passed through the unit as needed up to a maximum rate of 15 gal./min. This treatment reduces the hardness of the water to less than about 3.5 grains/gal. Each time 60 gal. of water flows through the unit, 0.5 gal. of aqueous 10 percent NaCl solution is passed on the opposite side of the cation exchange tube countercurrent to the water flow, followed by 1 to 2 gal. of water to rinse out the CaCl$_2$, MgCl$_2$ and excess NaCl. Since the average home unit processes about 180 gal./day, the unit will normally require 3 regeneration cycles/day.

The following examples are cited as illustrations to establish the operability of the present invention but are not to be construed to limit the same.

EXAMPLE 1

Graft copolymers of styrene-polyethylene were prepared from 10–20 feet lengths of fine polyethylene tubing (0.60 mm. O.D., 0.28 mm. I.D.) by irradiating the tubing with about 28 megarads, followed rapidly by flushing with nitrogen, and immersing the tubing in distilled styrene. By heating the mixture of styrene and irradiated tubing at about 62° C. for 20–40 hrs., a styrene-polyethylene copolymer was obtained. The tubing was removed from the excess styrene and washed thoroughly with hot toluene to remove residual styrene and homopolymer from the exterior and interior surfaces of the tube. The amount of styrene in the copolymer, as determined by weight gain, ranged from 34–48 percent with the higher values being obtained with longer polymerization periods.

The styrene-polyethylene copolymers were sulfonated by winding the tubes on a glass rod and contacting them with refluxing dichloromethane for one hour to swell the polymer. After cooling to room temperature, the swollen polymer and solvent were treated with excess chlorosulfonic acid added from a dropping funnel over a period of 15 min. After stirring another 15 minutes the chlorosulfonation solution was decanted and the dark tubing washed thoroughly with additional solvent, then acetone, and finally with distilled water. To insure complete hydrolysis of any sulfonyl chloride groups, the tubes were heated in water at 95–98° C. for several minutes. The resulting sulfonated tubing was light brown in color and had a feel similar to a wet rubber band. In water it had a diameter and length approximately twice that of the original polyethylene tubing. The wall thickness of the wet sodium form was about 0.35 mm. The tubes are quite stable, tough, and stand up well under normal handling and pressures.

The cation exchange capacity of the tubes in the acid form was determined by eluting with excess sodium chloride and titrating the eluent with standard sodium hydroxide. In general, the ion exchange capacity was 15–25 percent higher than estimated on the basis of the weight gained before sulfonation, assuming monosulfonation of each styrene nucleus. Since non-irradiated polyethylene tubing treated in a similar manner was not sulfonated, sulfonation under these conditions must occur largely on the aromatic nuclei of the copolymer.

Data on the capacity of several sulfonated styrene-polyethylene copolymers prepared as described are summarized in the table below.

*Table 1*

[Sulfonated Styrene-Polyethylene Copolymer]

| Tube | Capacity (meq./g. dry wt., H+ form) | Percent styrene | |
|---|---|---|---|
| | | By wt. gain | From capacity |
| A | 3.38 | 46 | 53 |
| B | 2.91 | 26 | 43 |
| C | 3.63 | 48 | 54 |
| D | 3.08 | 34 | 47 |

EXAMPLE 2

To test the water-softening properties of the sulfonated styrene-polyethylene copolymer tubes prepared as described in Example 1, varying lengths of the tubes were used. The average wall thickness in the sodium form was about 0.35 mm. with an outside diameter of about 1.3 mm. Surface area of the tubes used range from about 17 to 74 cm.$^2$. A single tube was placed in a small glass U-tube of approximately the same length as the cation exchange tube. By means of hypodermic needles inserted in the ends of the tubes and a small syringe pump, a CaCl$_2$ solution was passed through the cation exchange tube. A second pump was used to pass the regenerant NaCl solution over the outside of the cation exchange tube, countercurrent to the flow of the CaCl$_2$ solution. After establishing steady state conditions in the eluent stream, the treated water was analyzed using flame photometry for Ca$^{++}$ and Na$^+$, and potentiometric titration with AgNO$_3$ for the Cl$^-$.

Data from a number of tests are summarized in Table 2. With continuous circulation of a 10 percent NaCl regenerant solution, the operating efficiency was poor because of high leakage of Na$^+$ through the cation exchange tube into the CaCl$_2$ solution. However, with more dilute regenerant solutions, 80–85 percent of the hardness was removed with a Ca$^{++}$ transport as high as $18 \times 10^{-5}$ meq./cm.$^2$/min.

*Table 2*

[Water Softening With Cation Exchange Tubes]

| Run | Tube length (cm.)$^a$ | CaCl$_2$ feed (ml./hr.) | NaCl soln. (wt. percent) | Hardness$^b$ | | Ca$^{++}$ removed, percent | Ca$^{++}$ transport (meq./cm.$^2$/min.) |
|---|---|---|---|---|---|---|---|
| | | | | Initial | Final | | |
| A-1 | 200 | 32 | 1 | 30 | 4.4 | 85 | 5.8×10$^{-5}$ |
| B-1 | 118 | 33 | 1 | 30 | 7.6 | 75 | 9.3×10$^{-5}$ |
| B-2 | 118 | 16 | 1 | 30 | 5.2 | 82 | 5.0×10$^{-5}$ |
| C-1 | 115 | 66 | 1 | 30 | 12.5 | 58 | 18.0×10$^{-5}$ |
| C-2 | 115 | 66 | 0.2 | 30 | 14.7 | 51 | 15.5×10$^{-5}$ |
| D-1 | 66 | 17 | 10 | 30 | 22.5 | 25 | 2.8×10$^{-5}$ |

$^a$ Length immersed in NaCl soln.
$^b$ Grains CaCO$_3$/gal.

Higher transports are obtained with finer tubes. Also, the teaching of this invention can be succesfully applied to fine, flexible cation exchange tubes prepared from other polymers and copolymers with the same significant advantages and benefits in terms of continuous operation and efficiency.

I claim:

1. A method for softening hard water by cation exchange which comprises passing the hard water through a unit consisting of at least one cation exchange tube having an outside diameter of less than 2 mm. and arranged so that the hard water and the regenerant sodium salt solution required to maintain at least a minimum softening capacity by displacing the alkaline earth ions from the cation exchange tube flow separately and independently through the unit, one inside the cation exchange tube and the other outside.

2. The method of claim 1 wherein the hard water passes through the inside of the cation exchange tube in intimate contact with the walls thereof.

3. The method of claim 1 wherein the cation exchange tube has a substantially uniform outside diameter in the range of from about 0.01 mm. to about 2.0 mm. and a wall thickness of between about ⅓ to about ⅛ the outside diameter of the tube.

4. The method of claim 1 wherein the cation exchange functionally is a sulfonic acid.

5. The method of claim 1 wherein the cation exchange tube is a sulfonated styrene-polyethylene copolymer having an exchange capacity of at least 0.3 meq./g. dry tube, H$^+$ form.

References Cited by the Examiner

UNITED STATES PATENTS

| 2,411,238 | 11/46 | Zender | 210—22 |
| 2,858,264 | 10/58 | De Jong | 260—79.3 X |
| 2,972,349 | 2/61 | De Wall | 128—214 |
| 2,984,623 | 5/61 | Lee | 210—23 |
| 3,062,379 | 11/62 | Bryan | 210—501 |

OTHER REFERENCES

Carman: "Resistance of Tubes to Collapse"; University of Illinois Engineering Experiment Station, Bulletin No. 5, June 1906, pages 1–26, pages 12–17 particularly relied on.

MORRIS O. WOLK, *Primary Examiner.*